INVENTOR.
RUDOLPH C. RYDBERG

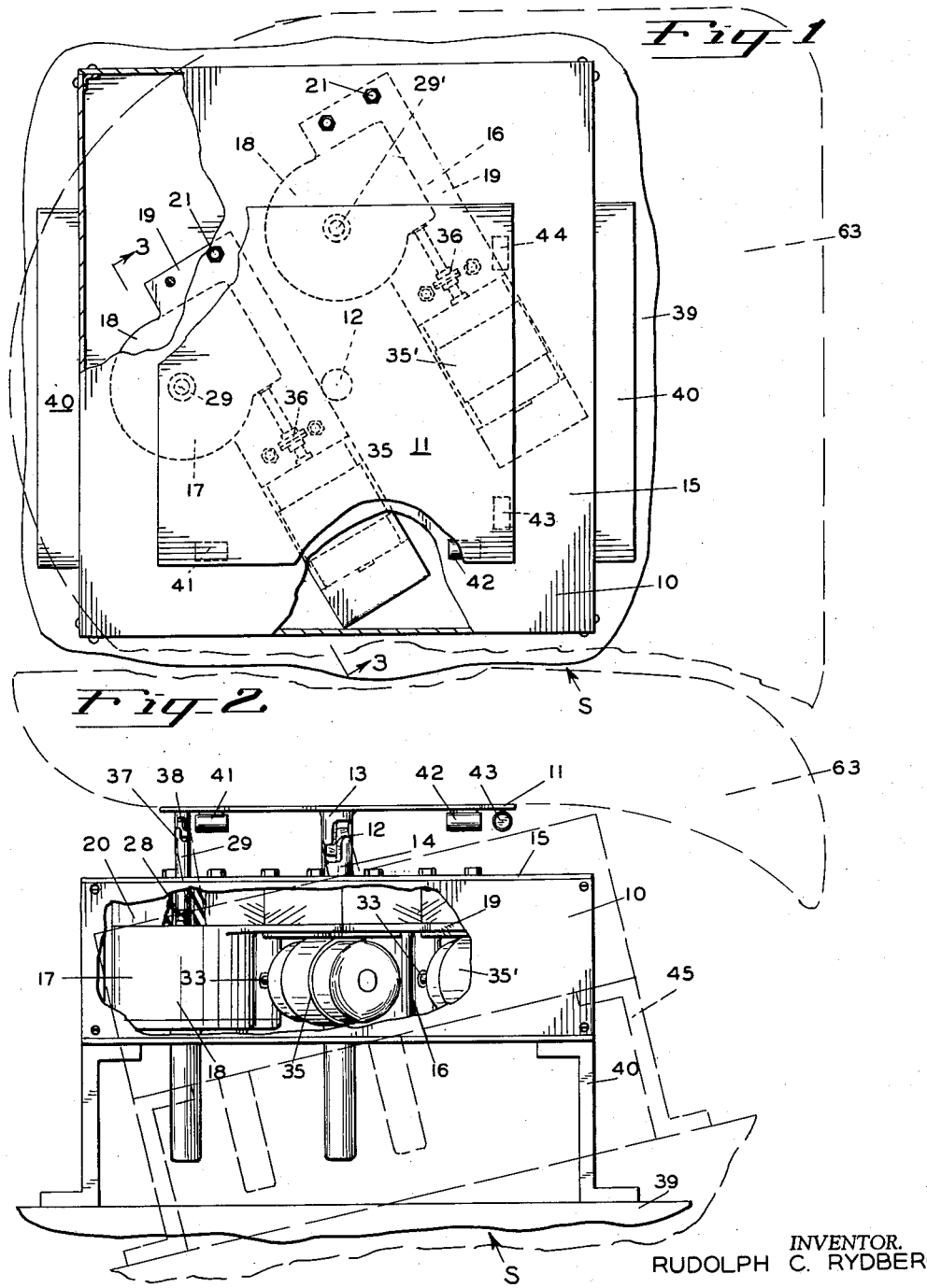

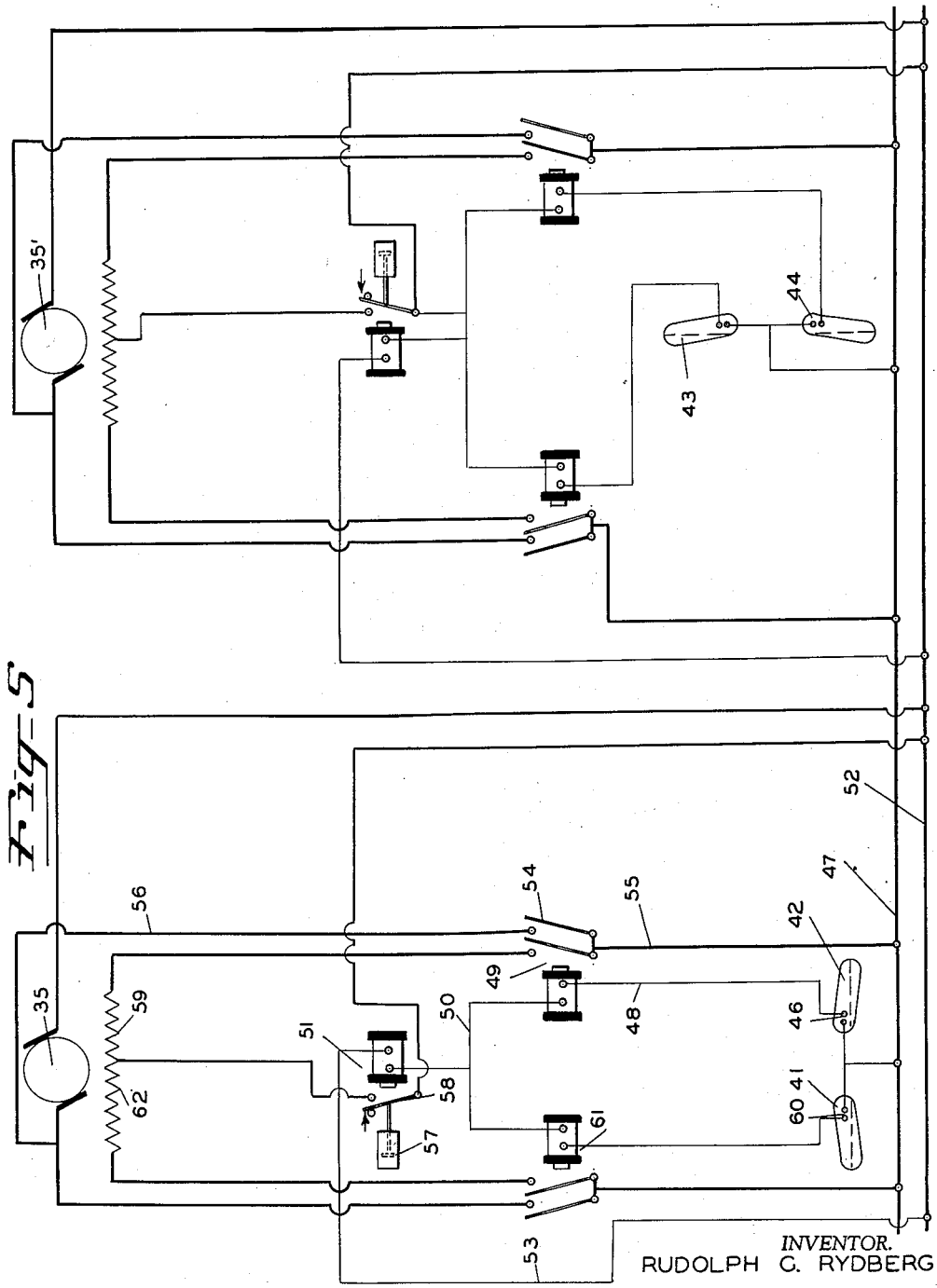

United States Patent Office 2,966,937
Patented Jan. 3, 1961

2,966,937

SELF-LEVELLING SEAT SUPPORT

Rudolph C. Rydberg, P.O. Box 398, Westfir, Oreg.

Filed July 15, 1958, Ser. No. 748,620

1 Claim. (Cl. 155—5)

The present invention relates to self-levelling seat supports particularly adapted to be used in connection with tractors and the like.

The primary object of this invention is to provide a support to maintain the seat on which the operator rides in a normally level condition regardless of the angle that the tractor assumes in its working operation. For instance, if a tractor was going up or down hill, the seat will level itself so that the operator sits squarely on the same and if the tractor was operating on a side hill and tilted sidewise, the seat will be automatically levelled.

Another object of the invention is to provide a self-levelling seat support which is completely self-contained, having all of its operating mechanism contained therein, making it adapted to attach on any type of tractor or like piece of machinery.

Other objects and advantages will become apparent in the following specification when considered in the light of the attached drawings, in which:

Figure 1 is a plan view of the invention having the seat removed therefrom with parts broken away and in section for convenience of illustration.

Figure 2 is a side elevation illustrating the seat in broken lines with parts broken away for convenience of illustration.

Figure 5 is a wiring diagram of the circuits used in the invention.

Referring now to the drawings in detail wherein like reference numerals indicate like parts throughout the several figures, the reference character S indicates generally the self-levelling seat support constructed in accordance with the invention.

Figure 3:
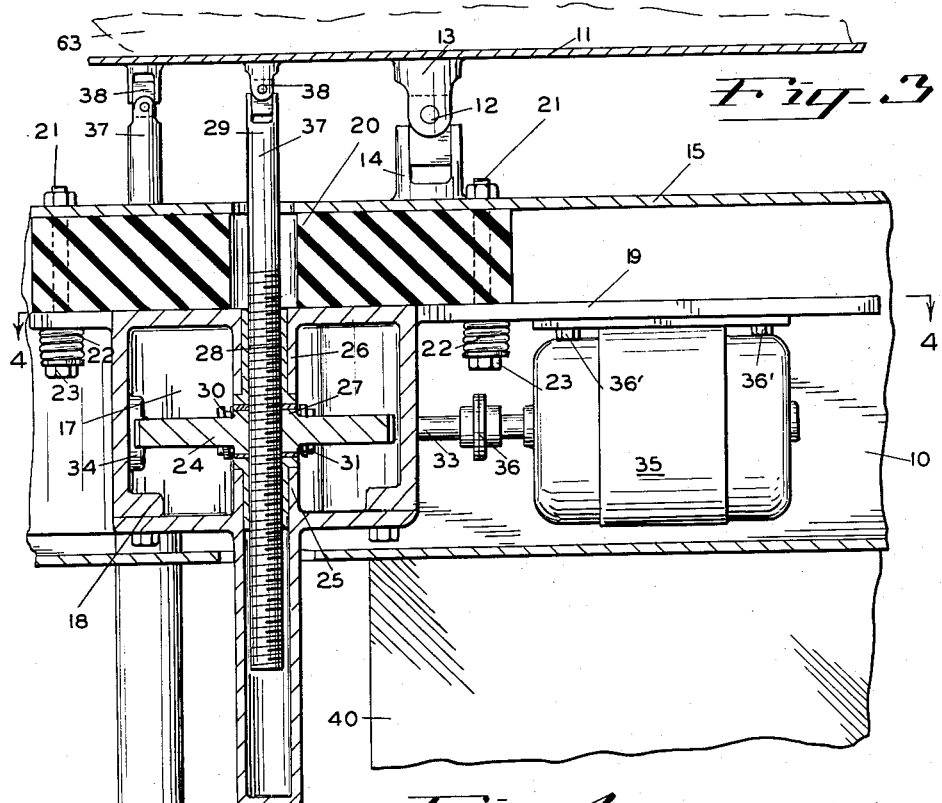
Figure 3 is a fragmentary enlarged vertical sectional view, taken on the line 3—3 of Figure 1, looking in the direction of the arrows.

The seat support S includes a housing 10, forming a base for a seat supporting platform 11 supported centrally thereof on a universal assembly 12. The upper portion 13 of the universal assembly 12 is fixedly secured to the platform 11. The lower portion 14 of the universal assembly 12 is fixedly secured to a cover plate 15 welded to the housing 10. Power operated levelling units 16 and 17 are located within the housing 10, and maintain the platform 11 in a level horizontal plane at all times.

Figure 4:
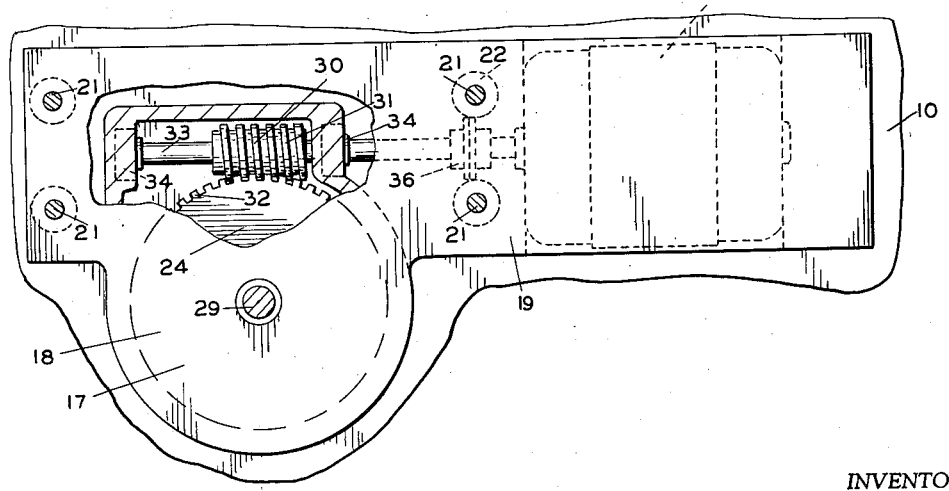
Figure 4 is an enlarged fragmentary horizontal sectional view taken on the line 4—4 of Figure 3, looking in the direction of the arrows, partially broken away for convenience of illustration.

Referring particularly to Figures 3 and 4, these levelling units 16, 17 include a housing 18 forming part of a base 19. The base 19 is mounted to the cover plate 15 of the housing 10 in the following manner. A resilient cushion 20 is disposed between the cover plate 15 and the base 19. Bolts 21 pass through the cover plate 15, through the cushion 20, through the base 19 and the resilient spring members 22 positioned between the base 19 and heads 23 of the bolts 21.

Located within the housing 18 is a worm wheel 24 disposed between bosses 25 and 26. The hub 27 of the worm wheel 24 is internally threaded to receive the threads 28 of a pedestal 29. The pedestal 29 is raised and lowered by cooperation of the threads 28 with the threads within the hub 27 of the worm wheel 24 upon rotation of the worm wheel 24. The worm wheel 24 is rotated by the worm 30 whose teeth 31 engage the teeth 32 of the worm wheel 24. The worm 30 forms part of the shaft 33 journalled within bearings 34 and extending beyond the housing 18. The shaft 33 has its outer end connected to a motor 35 by a universal coupler 36. The motor 35 is attached to the base 19 by bolts 36'. The upper end 37 of the pedestal 29 is secured to the underside of the platform 11 by a universal connection 38.

The levelling units 16 and 17 are located, as seen in Figure 1, so that one of the units levels the platform 11 in one direction, while the other unit levels the platform 11 in a transverse direction to the first mentioned direction.

While I have illustrated the base unit 10 as a special housing supported on the tractor body 39 by supporting legs 40, I do not wish to be limited to this structure, as the housing 10 might actually be the tractor body wherein the levelling units would be mounted directly within the body of the tractor, as well as the seat platform 11, the body of the tractor supporting the platform 11.

In the use and operation of the invention, referring first to Figure 5, a typical wiring diagram illustrates the operation of the levelling device wherein mercury switches 41 and 42 are mounted to one side of the platform 11 while mercury switches 43 and 44 are mounted to a second side at right angles thereto on the platform 11.

Referring to Figure 2, assuming the tractor and the base 10 assumes the position indicated by the broken lines 45, mercury closes the electric contacts 46 within the mercury switch 42 so that electric energy will flow from the main supply line 47 through the conductor 48, relay 49, conductor 50, into the delay relay 51 and back to the main line 52 through the conductor 53.

The switch bar 54 of the relay 49 delivers energy from the main line 47, through the conductor 55, conductor 56, to the motor 35. When the relay 51 is energized, the delay action mechanism 57 prevents the switch bar 58 from completing the circuit through the field 59 for a predetermined length of time and when the switch bar 54 is permitted to close this circuit the motor 35 will be started to raise the pedestal 29, levelling the platform 11 to the position shown in Figure 2 but in relation to the broken line position 45 of the base 10. When the platform levels, the contacts 46 will be broken, opening the relays 49 and 51, stopping the operation of the motor 35.

In the event the tractor would have assumed an exactly opposite position as that shown by the broken lines 45, the contacts 60 of the mercury switch 41 would have closed, completing an electric circuit through the relay 61 and the relay 51, which would energize the winding 62 of the motor 35, reversing the direction of rotation, which would lower the pedestal 29, levelling the platform 11 to its level position.

We will assume that the tractor was tilted sidewise or at right angles to the tilt indicated by the broken lines 45, one of the switches 43 or 44 would be energized, operating the motor 35' in a direction to either raise or lower the pedestal 29', which would level the platform 11 corresponding to the side tilt of the tractor. The same delay action would be required as indicated by the wiring circuit for this operation.

The object of delaying the action of the starting of the motors 35, 35' is to prevent operating the platform 11 under brief temporary conditions so that the platform is leveled only when an unbalanced condition exists over a period of time.

The mercury switches 41, 42, 43, 44 are very accurate and sensitive so that the slightest amount of unevenness of ground surface causes them to be operated.

Having thus described the preferred embodiment of the invention, it should be understood that numerous structural modifications and adaptations may be resorted to without departing from the scope of the appended claim.

What is claimed is:

A self levelling seat support for tractors comprising a generally horizontal base adapted to be secured to a vehicle, a platform arranged in spaced relation above said base, a universal assembly centrally positioned on said platform extending between and connecting said platform and said base, a pair of upright threaded shafts, a universal assembly securing the upper end of each shaft to the underside of said platform, said threaded shafts being positioned respectively adjacent one of a pair of perpendicularly extending edges of said platform, a pair of housings comprising a part of said base, each housing having a central vertical opening through which one of said threaded shafts extends, upper and lower spaced bosses in said housing, a worm wheel having a central threaded opening threadedly engaging an associated shaft positioned between said bosses, a worm gear in each housing engaging said worm wheel, a drive shaft for each worm gear, an individual reversible electric motor for each shaft, means for energizing each motor in two directions to actuate a shaft to level said platform upon lateral or longitudinal tilting, said last-mentioned means comprising an electric circuit for each motor, each circuit including a pair of solenoids and a solenoid actuated switch for each solenoid, a tiltable mercury switch for each solenoid, each switch adapted upon closure to actuate its associated motor in one direction, a third solenoid interposed in the circuit between said mercury switch and said first-mentioned solenoids, a third switch actuated by said last-mentioned solenoid and a time delay mechanism connected to said last-mentioned switch, whereby to prevent actuation of a motor upon momentary tilting of said base.

References Cited in the file of this patent

UNITED STATES PATENTS

| | | |
|---|---|---|
| 656,256 | Leisenring | Aug. 21, 1900 |
| 1,490,904 | Anders | Apr. 22, 1924 |
| 2,117,919 | Summers | May 7, 1938 |
| 2,568,402 | Lynn | Sept. 18, 1951 |
| 2,572,910 | Brown | Oct. 30, 1951 |

FOREIGN PATENTS

| | | |
|---|---|---|
| 136,363 | Germany | Nov. 25, 1902 |